United States Patent
Yelland et al.

(10) Patent No.: US 9,199,725 B2
(45) Date of Patent: Dec. 1, 2015

(54) CONTROL COMPUTER FOR AN UNMANNED VEHICLE

(75) Inventors: Bradford Scott Yelland, Belgrave (AU); Glen Eric Logan, Mt. Evelyn (AU); Paul Riseborough, Hoppers Crossing (AU)

(73) Assignee: BAE Systems Australia, Edinburgh S.A. (AU)

( * ) Notice: Subject to any disclaimer, the term of this patent is extended or adjusted under 35 U.S.C. 154(b) by 164 days.

(21) Appl. No.: 14/002,066

(22) PCT Filed: Feb. 14, 2012

(86) PCT No.: PCT/IB2012/000264
§ 371 (c)(1),
(2), (4) Date: Aug. 28, 2013

(87) PCT Pub. No.: WO2012/117280
PCT Pub. Date: Sep. 7, 2012

(65) Prior Publication Data
US 2013/0338856 A1 Dec. 19, 2013

(30) Foreign Application Priority Data

Feb. 28, 2011 (AU) ............................... 2011900735

(51) Int. Cl.
*G06F 7/00* (2006.01)
*B64C 13/18* (2006.01)
*G05D 1/00* (2006.01)
*B64C 13/20* (2006.01)

(52) U.S. Cl.
CPC ................ *B64C 13/18* (2013.01); *B64C 13/20* (2013.01); *G05D 1/0088* (2013.01); *B64C 2201/141* (2013.01)

(58) Field of Classification Search
None
See application file for complete search history.

(56) References Cited

U.S. PATENT DOCUMENTS

| 5,716,032 A | 2/1998 | McIngvale |
| 7,302,316 B2 | 11/2007 | Beard et al. |
| 2005/0251328 A1* | 11/2005 | Merwe et al. ................. 701/200 |
| 2006/0058928 A1* | 3/2006 | Beard et al. ..................... 701/11 |
| 2006/0260323 A1* | 11/2006 | Moulebhar ..................... 60/793 |
| 2007/0093946 A1 | 4/2007 | Gideoni |
| 2009/0157233 A1 | 6/2009 | Kokkeby et al. |

(Continued)

OTHER PUBLICATIONS

Australian Patent Office International-Type Search Report, issued on Apr. 19, 2011 by the Australian Patent Office, in corresponding Australian National Application No.: 2011900735. (3 pages).

(Continued)

*Primary Examiner* — Adam Alharbi
(74) *Attorney, Agent, or Firm* — Maine Cernota & Rardin

(57) ABSTRACT

A control computer for an unmanned vehicle, including: a sensor interface for receiving sensor data from sensors of the vehicle, the sensor data including data values associated with movement of the vehicle; an actuator control interface for sending actuator data to control actuators of the vehicle, the actuators controlling parts of the vehicle associated with controlling movement of the vehicle; and a system management component for executing a state machine having states corresponding to one or more phases of the movement and for determining a transition between current one of the states and another of the states based on at least one condition associated with the transition, at least one condition being determined based on at least one of the sensor data, the actuator data and status of the computer.

18 Claims, 8 Drawing Sheets

(56) References Cited

U.S. PATENT DOCUMENTS

2010/0042269 A1    2/2010  Kokkeby et al.
2011/0049992 A1*   3/2011  Sant'Anselmo et al. ....... 307/64

OTHER PUBLICATIONS

Rondon et al., "Optical Flow-Based Controller for Reactive and Relative Navigation dedicated to a Four Rotor Rotorcraft", IEEE/RSJ International Conference on Intelligent Robots and Systems, Oct. 10-15, 2009, pp. 684-689.

Ure, et al., "Design of a Multi Modal Control Framework for Agile Maneuvering UCAV", IEEE Aerospace Conference, Mar. 7-14, 2009, pp. 1-9.

Woithe et al., "A Programming Architecture for Smart Autonomous Underwater Vehicles", IEEE/RSJ International Conference on Intelligent Robots and Systems, Oct. 10-15, 2009, pp. 4433-4438.

International Search Report (PCT/ISA/210) issued on Jun. 22, 2012, by the Australian Patent Office as the International Searching Authority for International Application No. PCT/IB2012/000264.

Written Opinion (PCT/ISA/237) issued on Jun. 22, 2012, by the Australian Patent Office as the International Searching Authority for International Application No. PCT/IB2012/000264.

* cited by examiner

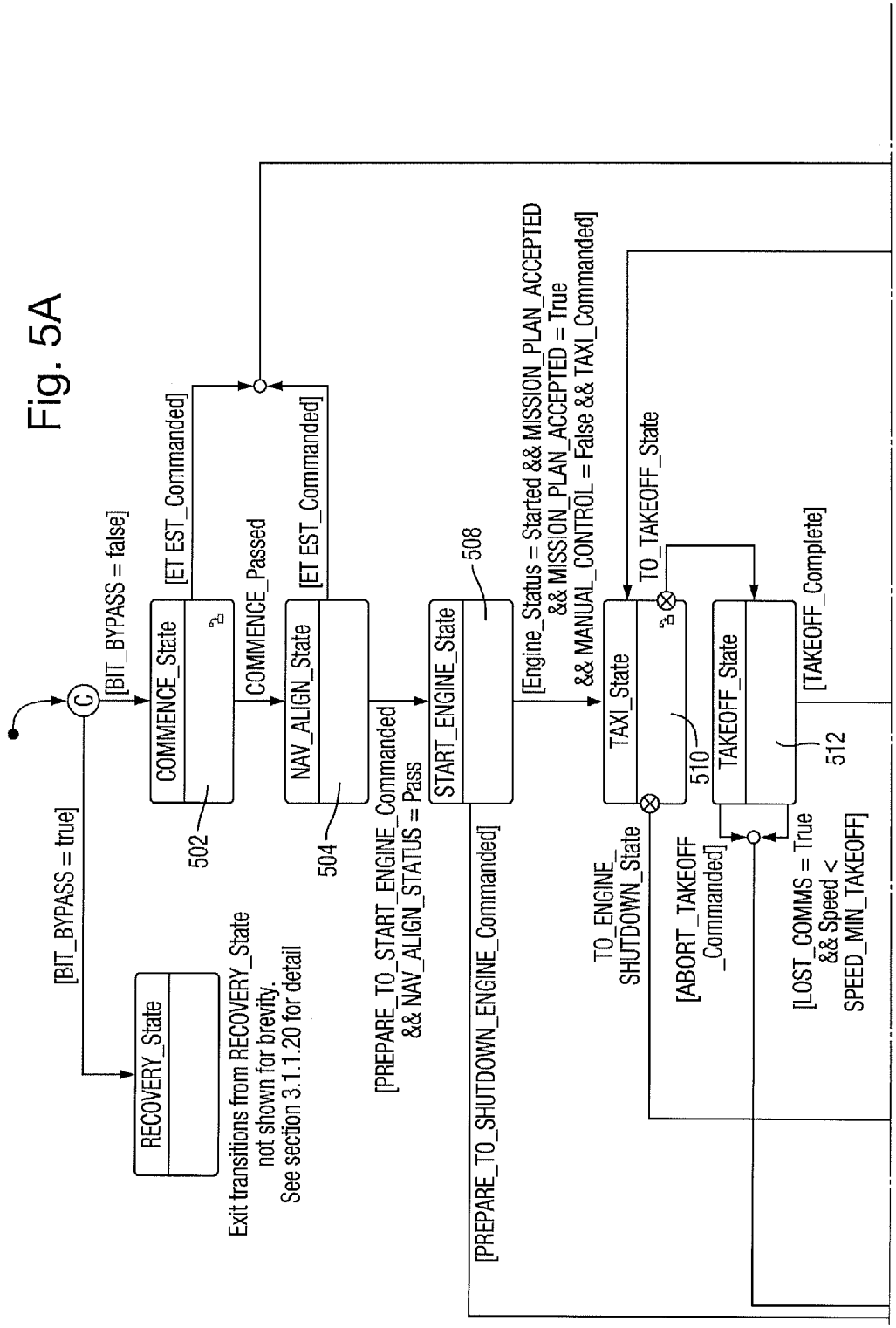

CONTROL COMPUTER FOR AN UNMANNED VEHICLE

FIELD

The present invention relates to a control computer for an unmanned vehicle that may be used to allow the vehicle to operate autonomously.

BACKGROUND

Unmanned vehicles, such as unmanned aerial vehicles (UAVs), are controlled remotely by an operator using a ground vehicle controller. The operator uses the ground controller, and various information provided by sensors of the vehicle, to guide the vehicle through different stages of movement and operation. The vehicle may include control processing circuitry to enable it to perform some operations autonomously, such as landing. Yet it is be necessary for the operator to determine what stage of movement the vehicle is currently in, and take control of the vehicle when necessary. For example, the operator may need to control the vehicle during flight until the operator decides the vehicle is in a suitable position to allow the vehicle to land autonomously.

Removing the need for continual manual intervention and allowing the vehicle to operate autonomously would give rise to a number of significant advantages. An autonomous vehicle would be able to operate effectively if communication with the remote vehicle controller is disrupted or disabled. Human errors associated with operator decisions could also be eliminated, particularly if the vehicle was able to discriminate between a wide variety of movement situations and navigate itself. A primary and significant difficulty is enabling the vehicle to determine when control changes between different movement stages or phases or in particular being able to switch between them and react like a person on the vehicle.

Accordingly it is desired to address this or at least provide a useful alternative.

SUMMARY

Embodiments described herein provide a control computer for an unmanned vehicle, including:
  a sensor interface for receiving sensor data from sensors of the vehicle, said sensor data including data values associated with movement of the vehicle;
  an actuator control interface for sending actuator data to control actuators of the vehicle, said actuators controlling parts of the vehicle associated with controlling movement of the vehicle; and
  a system management component for executing a state machine having states corresponding to one or more phases of said movement and for determining a transition between current one of said states and another of said states based on at least one condition associated with said transition, said at least one condition being determined based on at least one of said sensor data, said actuator data and status of said computer.

DRAWINGS

Embodiments of the present invention are hereinafter described, by way of example only, with reference to the accompanying drawings, wherein.

DESCRIPTION

Figure 1:
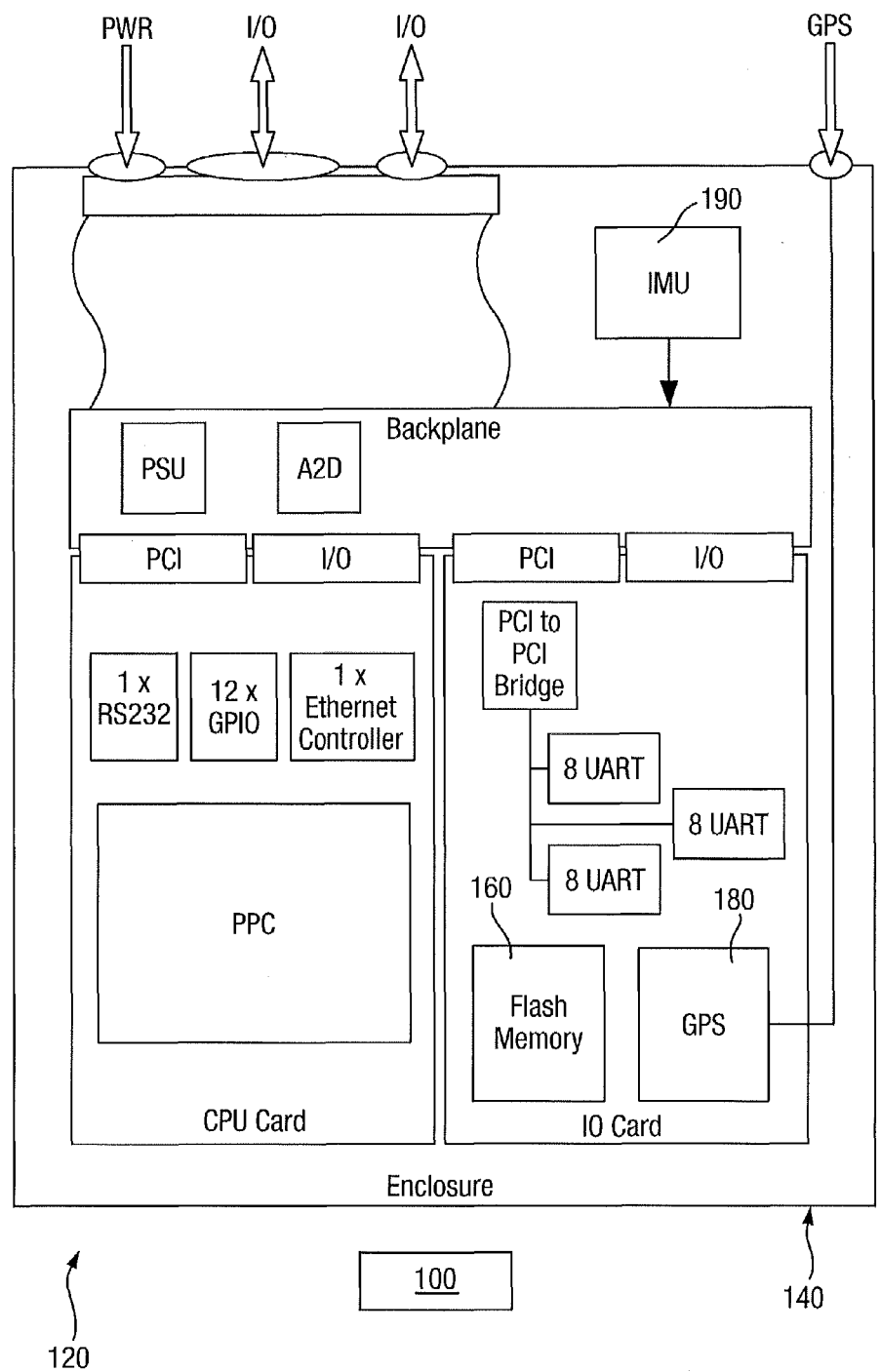
FIG. 1 is an architecture diagram of an embodiment of a control computer for an unmanned vehicle.
Figure 2:
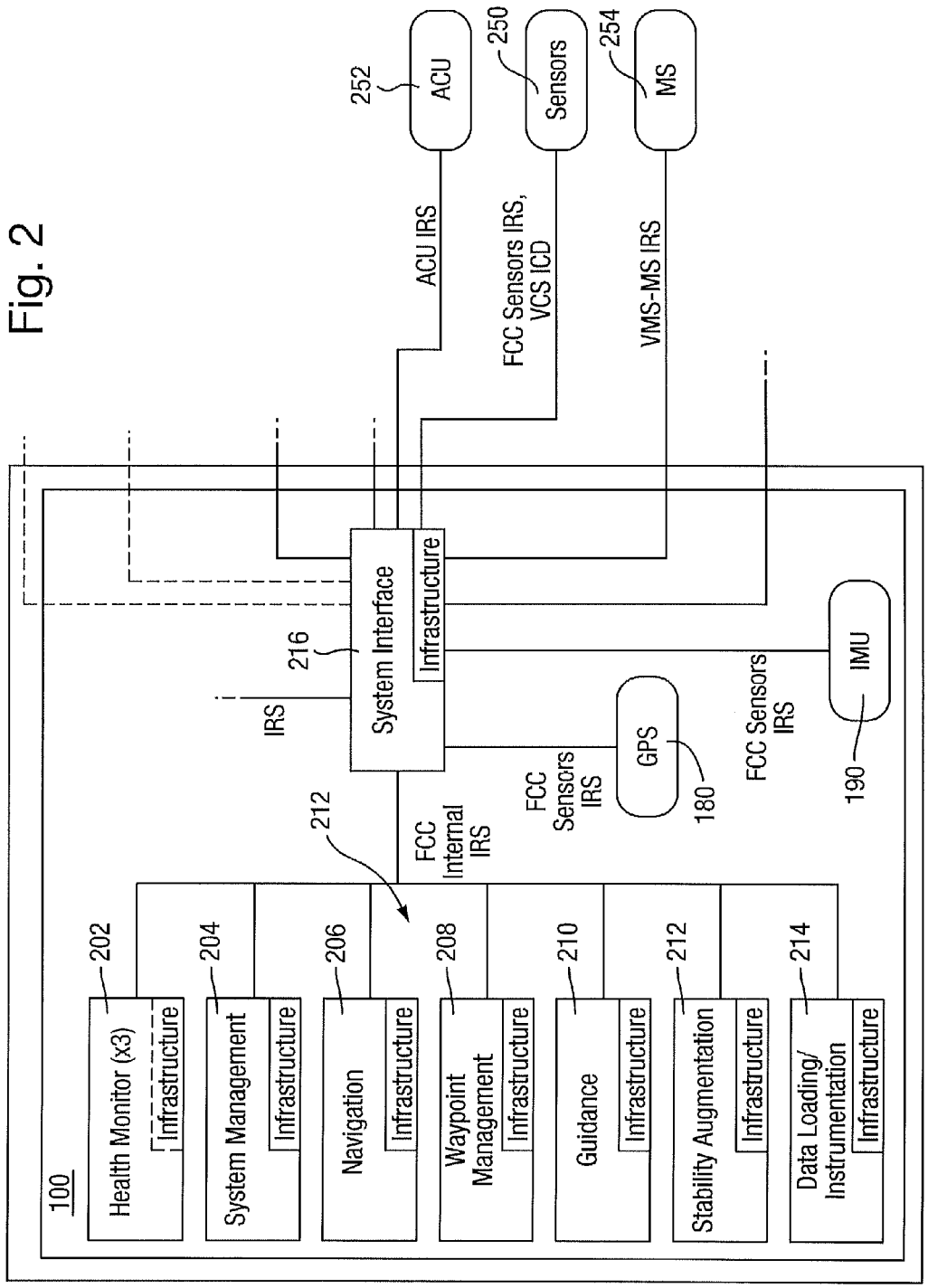
FIG. 2 is a block diagram of components of the control computer.

A flight control computer (FCC) 100 of an unmanned aerial vehicle (UAV), as shown in FIGS. 1 and 2, accepts and processes input sensor data from sensors 250 on board the vehicle. The FCC 100 also generates and issues command data for an actuator control unit (ACU) 250 to control various actuators on board the vehicle in order to control movement of the vehicle according to a validated flight or mission plan. The ACU 250 also provides response or status data, in relation to the actuators and the parts of the vehicle that the actuators control, back to the computer 100 for it to process as sensor data. The computer 100 includes Navigation, Waypoint Management and Guidance components 206, 208 and 210 to control a vehicle during phases of the flight plan. The computer 100, as shown in FIG. 1, includes a single board CPU card 120, with a Power PC and input/output interfaces (such as RS232, Ethernet and PCI), and an I/O card 140 with flash memory 160, a GPS receiver 180 and UART ports. The computer 100 also houses an inertial measurements unit (IMU) 190 and the GPS receiver (e.g. a Novatel OEMV1) 180 connects directly to antennas on the vehicle for a global positioning system.

The FCC 100 controls, coordinates and monitors the following sensors 250 and actuators on the vehicle:
  (i) an air data sensor (ADS) comprising air pressure transducers,
  (ii) an accurate height sensor (AHS), e.g. provided by a ground directed laser or sonar,
  (iii) a weight on wheels sensor (WoW),
  (iv) a transponder, which handles communications with a ground vehicle controller (GVC),
  (v) the electrical power system (EPS),
  (vi) primary flight controls, such as controls for surfaces (e.g. ailerons, rudder, elevators, air brakes), brakes and throttle,
  (vii) propulsion system, including
    (a) an engine turbo control unit (TCU),
    (b) an engine management system (EMS),
    (c) an engine kill switch,
    (d) carburettor heater,
    (e) engine fan,
    (f) oil fan
  (viii) fuel system,
  (ix) environmental control system (ECS) comprising aircraft temperature sensor, airflow valves and fans,
  (x) Pitot Probe heating,
  (xi) external lighting, and
  (xii) icing detectors.

The actuators of (v) to (xi) are controlled by actuator data sent by the FCC 100 to at least one actuator control unit (ACU) or processor 252 connected to the actuators.

The FCC 100 stores and executes an embedded real time operating system (RTOS), such as Integrity-178B by Green Hills Software Inc. The RTOS 304 handles memory access by the CPU 120, resource availability, I/O access, and partitioning of the embedded software components (CSCs) of the computer by allocating at least one virtual address space to each CSC.

Figure 3:
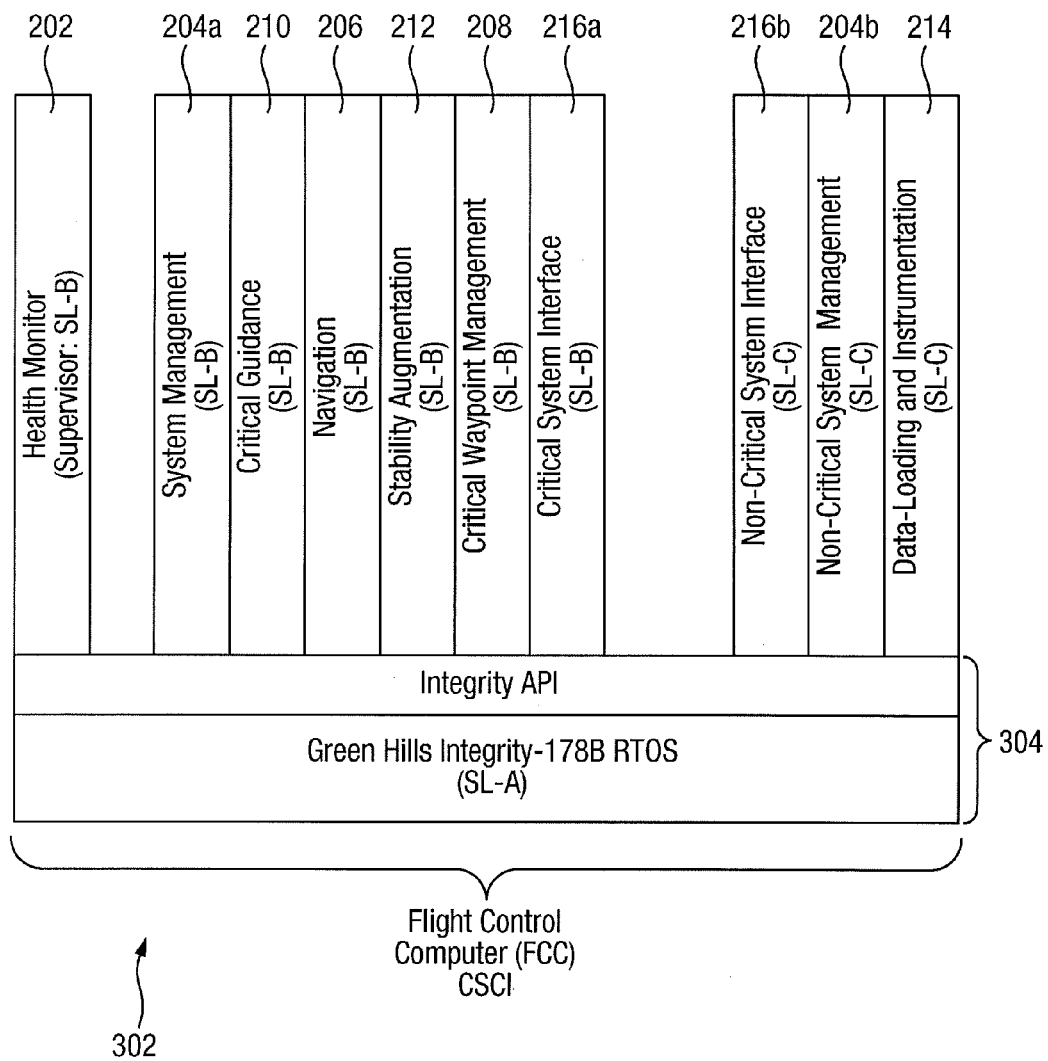
FIG. 3 is a diagram of the relationship between components of the control computer.

The FCC 100 includes a computer system configuration item (CSCI) 302, as shown in FIG. 3, comprising the computer software components (CSCs) and the operating system 304 on which the components run. The CSCs are stored on the flash memory 160 and may comprise embedded C++ or C computer program code. The CSCs include the following components:

(a) Health Monitor 202;
(b) System Management 204 (flight critical and non-flight critical);
(c) Navigation 206;
(d) Waypoint Management 208;
(e) Guidance 210;
(f) Stability Augmentation 212;
(g) Data Loading/Instrumentation 214; and
(h) System Interface 216 (flight critical and non-flight critical).

The Health Monitor CSC 202 is connected to each of the components comprising the CSCI 302 so that the components can send messages to the Health Monitor 202 when they successfully complete processing.

The System Interface CSC 216 provides low level hardware interfacing and abstracts data into a format useable by the other CSC's.

The Navigation CSC 206 uses a combination of IMU data and GPS data and continuously calculates the aircraft's current position (latitude/longitude/height), velocity, acceleration and attitude. The Navigation CSC also tracks IMU bias errors and detects and isolates IMU and GPS errors. The data generated by the Navigation CSC represents WGS-84 (round earth) coordinates.

The Waypoint Management (WPM) CSC 208 is primarily responsible within the FCC for generating a set of 4 waypoints to send to the Guidance CSC 210 that determine the intended path of the vehicle through 3D space. The WPM CSC 208 also (a) Supplies event or status data to the System Management CSC 204 to indicate the occurrence of certain situations associated with the vehicle.
(b) Checks the validity of received flight or mission plans
(c) Manages interactions with an airborne Mission System (MS) 254 of the vehicle. The MS sends route requests to the WPM 208 based the waypoints and the current active mission plan.

The Guidance CSC 210 generates vehicle attitude demand data (representing roll, pitch and yaw rates) to follow a defined three dimensional path specified by the four waypoints. The attitude rate demands are provided to the Stability Augmentation CSC 212. The four waypoints used to generate these demands are received from the Waypoint Management CSC 208. The Guidance CSC 210 autonomously guides the vehicle in all phases of movement.

The Stability Augmentation (SA) CSC 212 converts vehicle angular rate demands into control surface demands and allows any manual rate demands that may be received by the GVC to control the vehicle during ground operations when necessary. The SA CSC 212 also consolidates and converts air data sensor readings into air speed and pressure altitude for the rest of the components.

The Infrastructure CSC is a common software component used across a number of the CSCs. It handles functions, such as message generation and decoding, IO layer interfacing, time management functions, and serial communications and protocols such UDP.

The System Management CSC 204 is responsible for managing a number of functions of the FCC, including internal and external communications.

Figure 4:
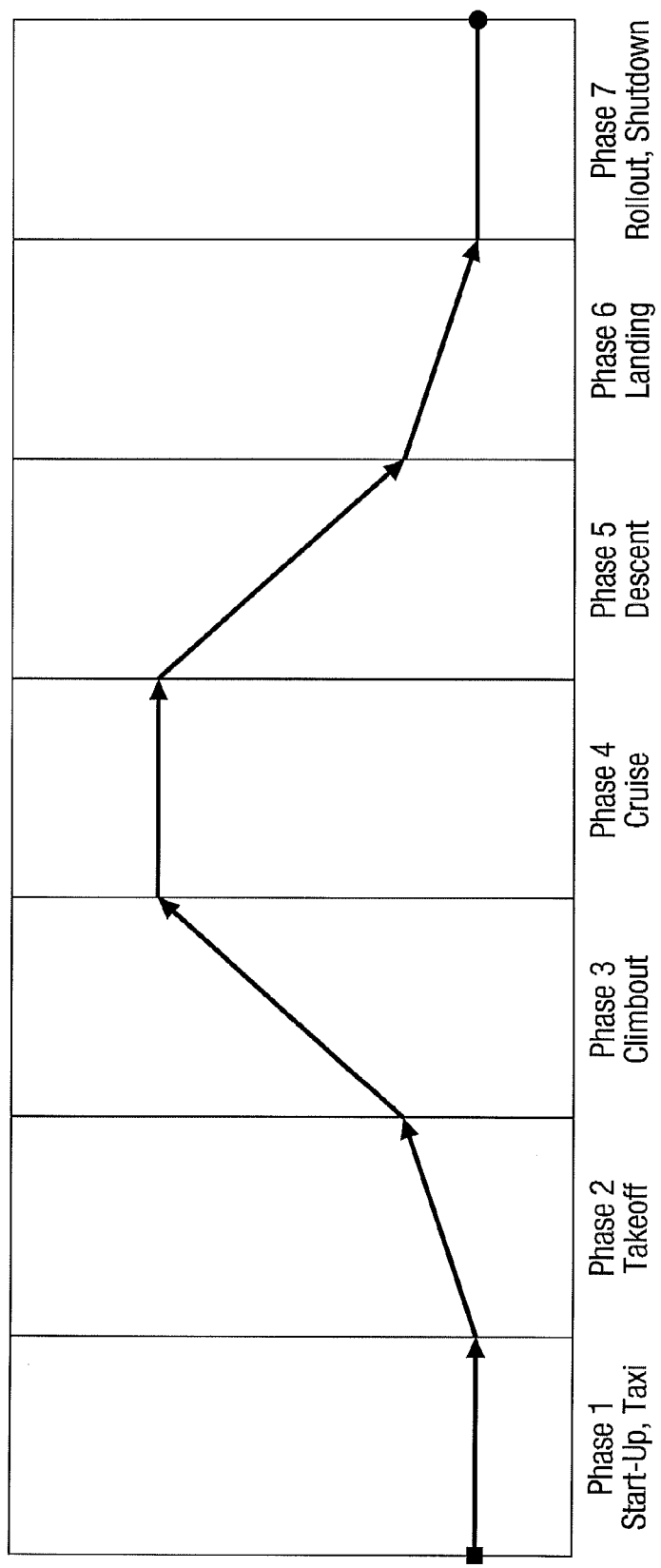
FIG. 4 is a diagram of phases of movement controlled by the computer.

A UAV operating according to a flight plan can be considered to move or operate through seven different phases of flight, as shown in FIG. 4. The seven flight phases are described below in Table 1.

TABLE 1

| Flight Phase | Mission Phase | Description |
| --- | --- | --- |
| Start-Up | Start-Up | Power on of the FCC, alignment of the Navigation component. |
| Taxi | Taxi | Movement from current position to the takeoff start position on the runway. |
| Takeoff | Takeoff | From the start position on the runway until the aircraft has left the ground and established a stable speed and climb. |
| Climb Out | In Flight | From the point where the vehicle has achieved a stable speed and climb until an operational altitude is achieved |
| Cruise | In Flight | Generic phase during which mission operations are performed. |
| Descent | In Flight | Descent from the operational altitude along a return path to the airfield |
| Landing | Recovery | The process of navigating and manoeuvring around the airfield to line up for an approach and the landing manoeuvre. |
| Rollout | Recovery | Deceleration of the vehicle after stable contact with the runway is achieved. |
| Shutdown | Shutdown | Stopping of the engine and subsequent removal of power to the FCC. |

The significant difficulty for autonomous vehicles is to be able to determine when the vehicle is in one of these phases, and also the transition between the phases. To achieve this, the FCC CSCI 302 includes a state machine that establishes one or a number of states for each of the phases of movement of the vehicle. The states each correspond to a specific contained operation of the vehicle such that transitions between states need to be managed carefully by the state machine to avoid damage or crashing of the vehicle. The state machine controls operation of the CSCI together with the operations that it instructs the vehicle to perform. The states and their corresponding phases are described below in Table 2.

TABLE 2

| Flight Phase | States | Description |
| --- | --- | --- |
| Start-Up | COMMENCE | Initial state, performs continuous built in testing (CBIT) checking. |
|  | NAV_ALIGN | Calculates initial heading, initialises Navigation 206. |
|  | ETEST | A state where systems testing may be performed. |
|  | START_ENGINE | Starting of the engine is effected. |
| Taxi | TAXI | Manoeuvre vehicle to takeoff position. |
| Takeoff | TAKEOFF | The vehicle is permitted to takeoff and commence flight. |
|  | CLIMBOUT | The vehicle establishes a stable speed and climb angle |

TABLE 2-continued

| Flight Phase | States | Description |
| --- | --- | --- |
| Climb out, Cruise | SCENARIO | The vehicle follows waypoints generated based on a scenario portion of a flight or mission plan. |
| | LOITER | Holding pattern where a left or right hand circle is flown. |
| Descent | INBOUND | Heading back to the runway and airfield. |
| Landing | CIRCUIT | Holding in a circuit pattern around the airfield. |
| | APPROACH | In a glide slope approaching the runway. |
| | LANDING | Flaring, and touching down on the runway. |
| Rollout | ROLLOUT | Confirmed as grounded, and deceleration of the vehicle tracking the runway centreline. |
| | TAXI | Take the vehicle to shutdown position. |
| Shutdown | ENGINE_SHUTDOWN | Termination of engine operations. |
| | SHUTDOWN | Termination of the FCC. |

Figure 5B:
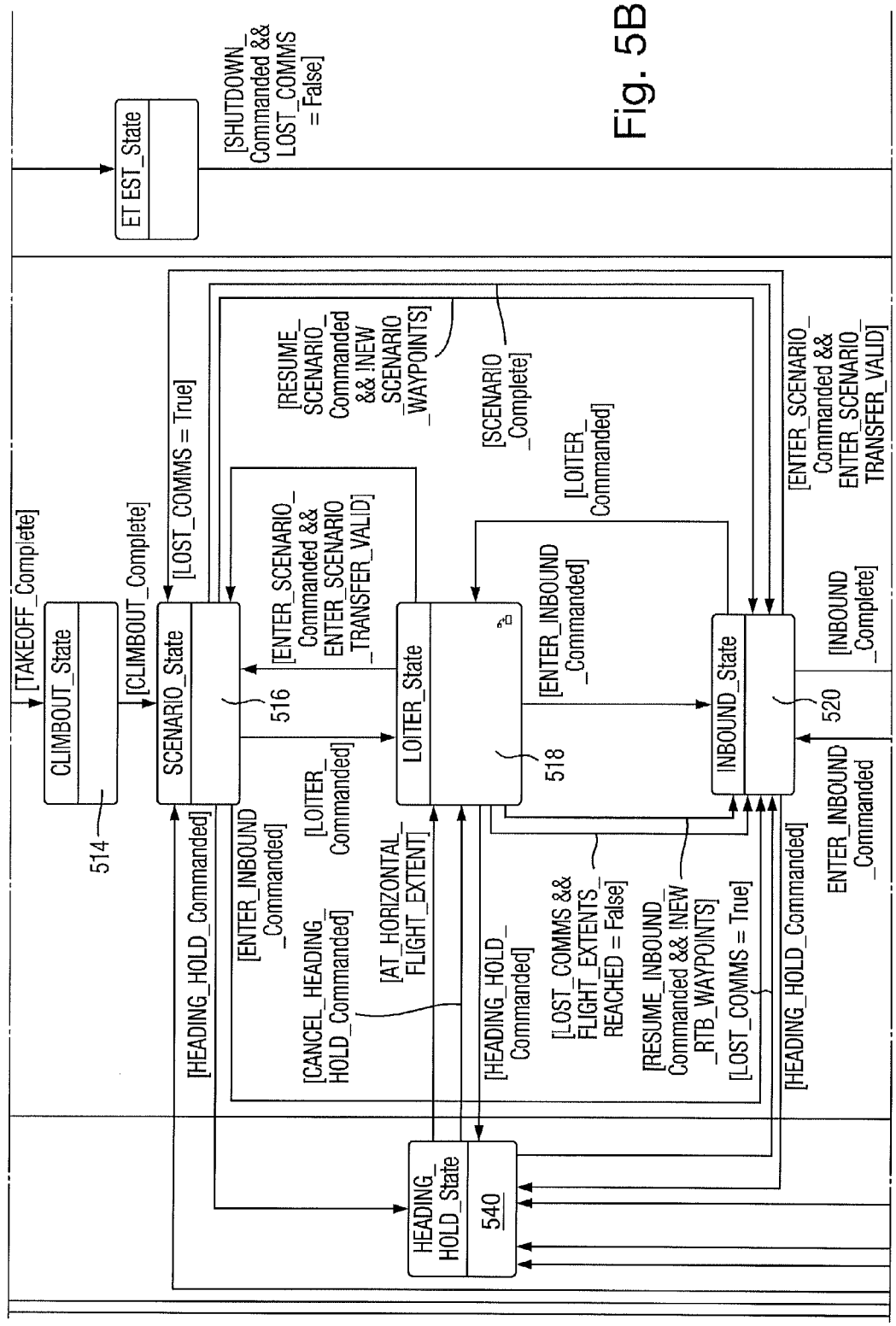
FIG. 5 (A, B and C) is a diagram of a state machine of the computer.
Figure 5C:
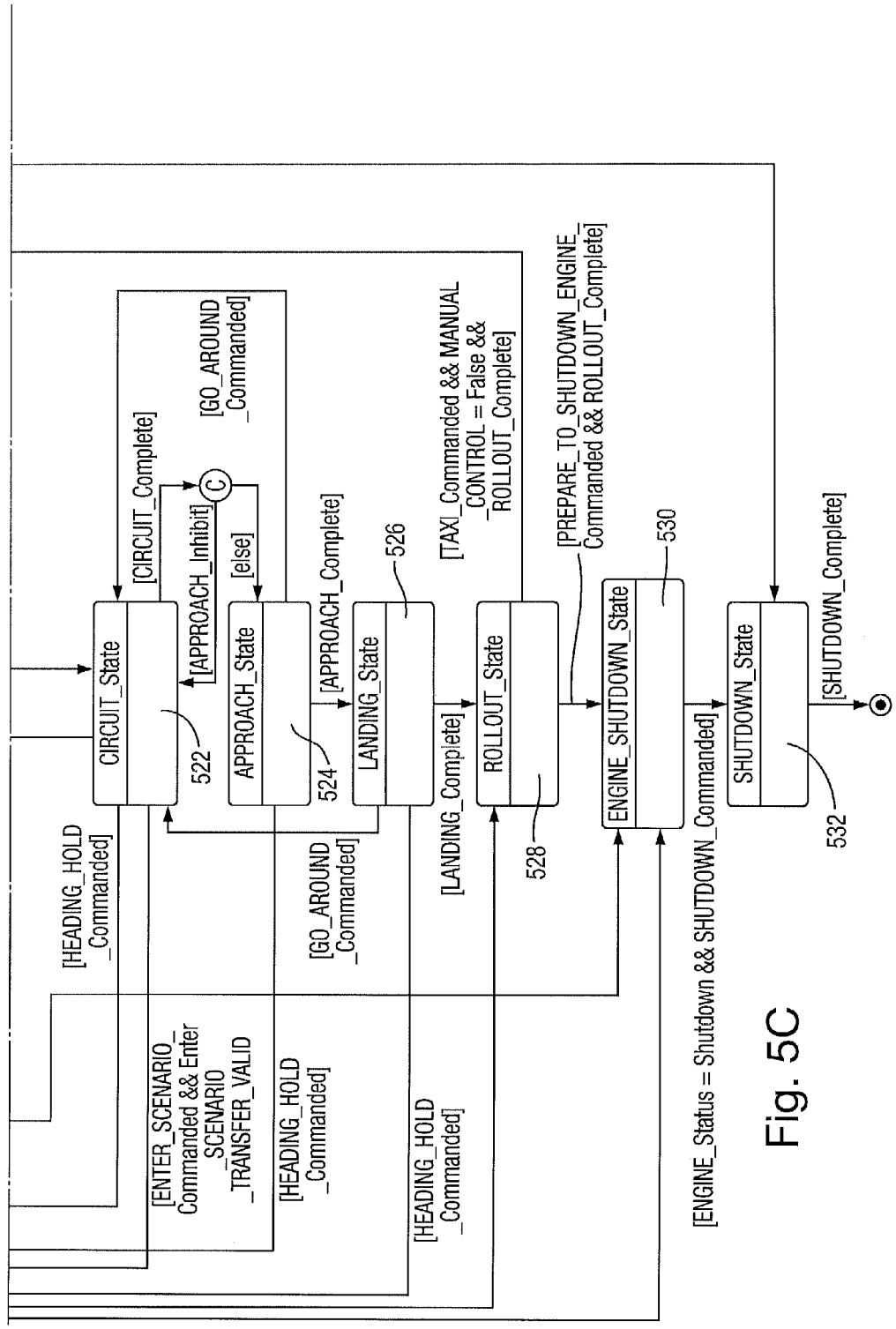

The System Management Component 204 defines, establishes and executes the state machine by determining the existing state and effecting the changes between the states based on the conditions and available transitions for each state, and based on data provided by the CSCs, such as Guidance, Navigation and Stability Augmentation and Waypoint Management which depend on the current state. The data provided by the CSCs affecting the states is in turn dependent on the sensor data and received by the FCC 100. A state diagram of the state machine is shown in FIGS. 5A, 5B and 5C. The states are represented by the boxes, the lines represent the transitions, and the transition conditions, discussed below, are indicated on or adjacent the transition lines. The transition conditions are defined by parameters (e.g. flags, commands, demands, etc.) of the CSCs having certain data values, as indicated and discussed below.

The Commence_State 502 is the first state entered when the System Management Component 204 initialises. In this state, the component undertakes system status checks in order to determine the overall health of the flight control computer 100. Once a continuous built-in test circuit (CBIT) of the vehicle indicates the IMU sensors, GPS, and air data sensors and other hardware and software is healthy, the system management sets a Commence_Status flag to a pass value. In the Commence_State the computer 100 also configures the vehicle systems so as to:

(a) set all wheel brakes to fully engaged
(b) set control surfaces to zero angular rate control
(c) set engine throttle demand to idle
(d) disable the auto-throttle Once the Commence_Status flag is set to pass, the state machine transitions to the Nav_Align_State 504 and the Navigation CSC 206 of the FCC 100 performs further analysis on the health and performance of the GPS and IMU sensors. The FCC assumes that the aircraft is stationary whilst in this state and therefore data received from these sensors is not expected to vary beyond accepted sensor noise limits. Any variations in the angle, angular rate and acceleration data from the IMU 190 or the position and velocity data from the GPS 180 that exceed these noise limits are flagged as faulty. The FCC additionally checks IMU and GPS sensor health flags and analyses the sensor rate to ensure the sensors are outputting valid data at the required sensor rate.

Within Nav_Align_State, the GPS data is additionally analysed by the Navigation CSC 206 to ensure the data from at least two different antennas used by the vehicle indicate the correct separation and suitability for vehicle heading estimation. The FCC also generates an average of the position data from the GPS and the angle data from the IMU tilt sensors using the assumption of no motion. This average is performed for a period of 60 seconds to reduce the effects of sensor noise upon the average. This average position and roll and pitch angles are used with a heading estimate derived from the dual GPS antenna position difference to provide an initial estimate of position and attitude. The Navigation CSC 206 completes the state successfully when positional and velocity data values have been correctly determined, including data values for pitch and roll (from IMU tilt data), yaw (from positional difference of the GPS antennas), latitude, longitude and height (from the GPS data) and bias values for gyroscopes and accelerometers of the IMU 190.

The E-Test_State 506 is used for testing diagnostics. The FCC transitions to this state from either the Commence_State or Nav_Align_State if any Test Commanded message is generated and received. This may be generated and sent from the remote ground vehicle controller (GVC).

The FCC enters the Start_Engine_State 508 if the Nav_Align_State has been completed successfully by Navigation CSC 206 (indicated by a Nav_Align_Status flag being set to pass) and a Prepare_To_Start_Engine command message has been received. The Prepare_To_Start_Command message may be generated and received from the GVC or generated by the System Management Component 204 once the Nav_Align_State has been successfully completed.

In the Start_Engine_State 508, the FCC generates and sends an engine start command for the System Interface 216 which in turn sends actuator data to the ACU 252 to start the engine. The FCC monitors the engine status by analysing the engine RPM over a 10 frame period. The FCC can be set to run at 100 Hz so the CSCs run 100 execution blocks every second, where each block can considered to be frame of 10 ms duration. Once the RPM of the engine has exceeded a predetermined threshold over this 10 frame period, it is deemed to have started and an Engine_Status flag is set to started. A flight or mission plan also needs to have been successfully loaded, passed and accepted before the FCC is allowed to transition to the TAXI_State 510. It may also be a requirement that the GVC indicate that it will not be manually controlling the vehicle, thereby setting a Manual_Control flag to false. A Prepare_To_Shutdown_Engine command can also be sent by the GVC to transition the FCC to the Engine_Shutdown_State 530.

In the Taxi_State 510 the FCC controls ground movement of the vehicle so as to move it from its current position to a position on the runway from which it can transition to the Takeoff_State 512.

During the Taxi_State, it is possible for changing conditions to cause the vehicle to over-speed (which could result in the vehicle becoming accidently airborne). To mitigate this failure mode, the FCC monitors the air and ground speeds and will cut the throttle to idle and deploy airbrakes when a ground or air speed threshold is exceeded. If this action is not effective and the speed continues to increase, the FCC will demand wheel braking.

In order to transition to the Takeoff State 512, the FCC must determine that the vehicle is:
(a) within 5 meters laterally of the runway centreline (specified via the line between the holding point and takeoff point in the mission plan);
(b) is no more than 10 meters past the holding point in the runway direction;
(c) is within 10 meters of a holding point height;
(d) has a heading within 5 degrees of a runway vector heading;
(e) is moving at less than 2 m/s; and
(f) the CBIT status is healthy.

It may also be a requirement that a Takeoff_Command be received from the GVC.

Upon receipt of a Prepare_To_Shutdown_Engine_Command message from the GVC, the FCC will transition to Engine Shutdown State 530 from the Taxi State 512.

In the Takeoff_State 512, the FCC generates and outputs actuator demands including actuator data to:
(a) accelerate the vehicle;
(b) achieve a horizontal trajectory defined by a takeoff trajectory or path of the mission plan; and
(c) perform a takeoff rotation when the EAS is equal to a minimum threshold for takeoff.

Other demands may include:
(c) maintain the vehicle on the ground until an effective air speed (EAS) threshold is reached so as to raise the wheel(s); and
(d) follow a defined takeoff pitch attitude profile for an EAS greater than the EAS threshold, resulting in raising the wheel(s)

As takeoff commences, the FCC 100 commands a 100% throttle for the engine (or a maximum permitted by the mission plan) and releases the air and wheel brakes.

The FCC may also generate commands specific to a particular aircraft. For example, the FCC may command the aircraft tail to lift once past 70% stall speed and will then command a rotation once the speed passes 115% stall speed. This manoeuvre is intended to reduce the aircraft drag during the ground run and to provide a clean rotation for takeoff, rather than leave the vehicle with the wheel(s) on the ground and let the vehicle lift itself from the ground when sufficient lift is available (which could result in flight at or very near the stall condition).

The FCC sets a Takeoff_Complete parameter to true and transitions to the Climbout_State 514 when two of the following three conditions are satisfied:
(i) EAS is greater than a threshold, say 30 m/s;
(ii) Weight is on wheels is zero more often than not for both wheels for the last 11 frames, i.e. 110 ms
(iii) Vertical speed is greater than 1 m/s These conditions are designed to alleviate problems detecting takeoff with failed WOW or pressure sensors.

The FCC transitions to the Rollout State 528 if an abort takeoff command is received from the GVC. It may also be decided to transition to this state if communications with the GVC are lost prior to a takeoff decision speed (e.g. 80% of estimated stall speed).

In Climbout_State 514 the FCC generates actuator data to demand maximum throttle (i.e. 115% of the throttle) and tracks or follows a horizontal trajectory or path defined by a climbout portion of the mission plan. The FCC also issues commands to maintain a climbout pitch angle, for example of 7 degrees. This ensures the vehicle executes a more robust climb than providing a specific climb path which can result in under speed conditions and a potential stall condition or large angular rates when in close proximity to the ground. The FCC transitions to the Scenario_State 516 when it receives sensor data indicating one of the following conditions are true:
(a) the vehicle altitude has reached a specified height threshold;
(b) the vehicle EAS is greater than an EAS to be achieved for climbout; and
(c) the horizontal position of the vehicle has reached a climbout waypoint that is specified in the climbout portion of the mission plan.

The conditions account for different climb performance for the aircraft and prevent an overspeed or held throttle occurrence.

In the Scenario_State 516 the FCC moves the aircraft through scenario waypoints defined in the mission plan, and tracks the horizontal and vertical paths specified by the waypoints whilst also maintaining the air speed specified by the Waypoint Management CSC 208. The FCC generates actuator data to cause the vehicle to follow a trajectory defined by a scenario portion of the mission plan. The FCC modifies the mission plan scenario trajectory when a GOTO_Waypoint_Command is generated by the Waypoint Management CSC 208. When a series of valid waypoints defining a route are provided to the FCC by the Airborne Mission System (AMS) 254, the path between two mission plan waypoints is defined by route points effectively providing an alternate path between two way points instead of a straight line. A route is accepted by the FCC 100 from the AMS 254 once the Waypoint Management CSC 208 determines the route passes vehicle performance and waypoint geometry checks and no more than 2 bad routes have been received in a row from the AMS.

The FCC transitions from the Scenario_State to a Loiter_State 510 when a Loiter Command is generated, which may be sent by the GVC. The FCC transitions to the INBOUND_State 520 when the vehicle passes the last scenario waypoint in the mission plan or an Inbound_Command is received. The FCC can also be configured so that the transition to the Inbound_State 520 occurs if the vehicle detects loss of communications with the GVC.

A Heading_Hold State 540 is entered into from either the Scenario_State 516, Loiter_State 518, Inbound_State 520, Circuit_State 522, the Approach_State 524 and the Landing_State 526 if a Heading_Hold command is generated and received by the FCC 100. The Heading_Hold command may be generated by an operator of the GVC in response to a direction issued by air traffic control. The Heading_Hold command includes data representing a particular directional heading that the vehicle is to follow, and accordingly the FCC 100 generates actuator data so the vehicle follows that directional heading, e.g. 90° relative to true north. In the Heading Hold State 540 the aircraft will continue to maintain the heading at a fixed altitude, until the FCC transitions to another state. The FCC transitions to a Loiter_State 518 if a Cancel_Heading_Hold command is generated and received or a horizontal flight extent is reached. The FCC 100 will also transition to the Inbound_State 520 if communications is lost with the GVC.

In the Loiter_State 518, the FCC 100 generates actuator data so that the vehicle follows a trajectory defined by a loiter portion of the mission plan, which effectively causes the vehicle to enter into laps of a loiter pattern flight plan. In the LOITER_State, the FCC is able to accept and operate on the basis of a new mission plan.

When the FCC is in the Loiter_State 518 and receives a Resume_Scenario_Command (which may be sent by the GVC), and the previous state was the Scenario_State 516, the FCC will transition its state to Scenario_State upon completion of the current lap of the loiter pattern. In this case, once changing to Scenario_State the vehicle will resume the scenario waypoints from where they were left when entering the Loiter_State.

When the FCC is in the Loiter_State 518 and receives an Enter_Scenario_Command (which may be sent by the GVC), the FCC will transition it's state immediately to Scenario_State if the generated path to fly to a supplied Scenario Entry Waypoint does not violate an allowed flight area (as defined by flight extents of the mission plan).

When the FCC is in Loiter_State 518 and receives a Resume_Inbound_Command (which may be sent by the GVC) and the previous state was the Inbound_State, the FCC will transition its state to the Inbound_State 520 upon completion of the current lap of the loiter pattern. In this case, once changing to Inbound_State 520 the vehicle will resume an inbound entry path from where it was left when entering the loiter pattern.

When the FCC is in the Loiter_State 518 and receives an Enter_Inbound_Command from the GVC, the FCC will transition its state to Inbound_State immediately, performing an inbound entry as discussed below.

If the FCC is in the Loiter_State 518 and a new mission plan is accepted and activated, the resume scenario and resume inbound transitions are disabled. The only airborne state where a new mission plan may be activated is the Loiter_State. The resume inbound transition is also disabled if the FCC is in the Loiter_State from inbound and the landing runway is changed.

The Inbound_State 520 is entered when, as discussed above, the scenario portion of the mission plan is complete or a command is issued or received to return back to base. The Inbound_State 520 is a safety state to which the other states transition if an error or a danger condition occurs, and the vehicle needs to be safely recovered and returned to base. For example, if communications is lost with the GVC, the Scenario_State 516, the Loiter_State 518, the Heading_State 540 can transition directly to the Inbound_State 520. In the Inbound_State 520 the computer 100 generates actuator data to follow a trajectory defined by an inbound portion of the mission plan. In this state, the FCC can accept and change its active return to base waypoints or update the inbound trajectory. This allows the Inbound_State to consist of a dynamically generated entry into a statically defined inbound path to an airfield.

Figure 6:
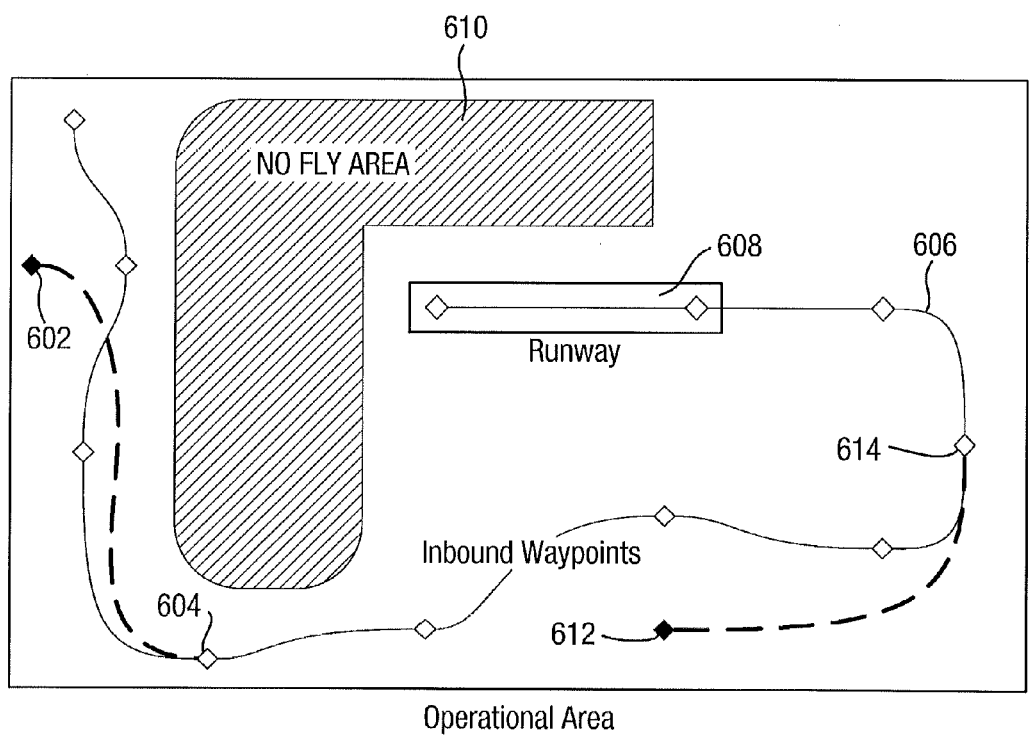
FIG. 6 is plan of an operational area managed by the computer.

The FCC selects an inbound entry point (mission plan inbound points are designated as entry or no entry) that gives the shortest flight path (following the inbound waypoints from the entry point) back to the landing airfield that does not violate a flight extent. Static mission plan checks are performed by the FCC 100 to ensure that from all positions within the flight extents it is possible to reach at least a single inbound entry point, from where a safe path to return to the landing airfield is guaranteed. As shown in FIG. 6, if the vehicle is currently at a point 602, the FCC 100 selects an inbound waypoint 604 of the inbound trajectory 606 that is closest to the runway 608 and that the vehicle can fly to without violating the flight extents defining a no fly area 610. If the vehicle is at a position 612 and no flight extents prohibit inbound entry, the FCC 100 will join the inbound trajectory 606 at an inbound waypoint 614 much closer to the final inbound waypoint before the runway 608.

If the FCC is in the Inbound_State 520 and the vehicle violates flight extents (a possible reason for this includes degraded vehicle climb/dive performance), the Waypoint Management CSC 208 will force a transition to the Loiter_State 518 with the demanded (rather than the achieved) altitude. This will force the vehicle to climb over (or descend under) the flight extent as required. Upon reaching the demanded altitude, the FCC will generate a Resume_Inbound_Command. If in a lost communications situation, the lost communications transition out of the Loiter_State will be disabled, to prevent the vehicle transitioning back to inbound prior to the altitude being reached. This lost communications disable only applies if the Loiter_State was entered from the Inbound_State.

On completion of the last inbound waypoint, as determined by the Waypoint Management CSC 208, based on data from the Guidance CSC 210, the FCC 100 transitions to the from the Inbound_State 520 to the Circuit_State 522

In the Circuit_State 522, the FCC manoeuvres the vehicle around the airfield to line it up for an approach to the runway. In this state the FCC generates actuator data to follow a trajectory defined by a circuit portion of the mission plan. The FCC will transition into Scenario_State 516 if an Enter_Scenario_Command is received (e.g. from the GVC) during the Circuit_State and the entry path to the supplied entry waypoint does not violate the flight extents. The FCC will transition into Inbound_State 520 if an Enter_Inbound_Command is received (e.g. from the GVC) during the Circuit_State.

The FCC transitions from the Circuit_State 522 to the Approach_State 524 when the vehicle reaches a circuit waypoint of the circuit portion trajectory that designated as the Circuit Exit Waypoint. This waypoint is aligned with the runway to give a non-manoeuvring transition into the approach.

The Circuit_State to Approach_State transition is disabled on receipt of an Inhibit_Approach_Command (e.g. from the GVC). In this case, the FCC will continue to direct the vehicle along the circuit waypoints. When the FCC reaches the last circuit waypoint in the mission plan, it will loop back to the circuit trajectory by moving to a waypoint designated as a Circuit Repeat waypoint. The Inhibit_Approach_Command is then cleared to allow a transition to the Approach_State.

If the Circuit_State is entered from the Approach_State 524 or the Landing_State 526, the FCC will use abort circuit waypoints from the mission plan (which will typically start from the far end of the runway) instead of the normal circuit waypoints which will start near the final inbound waypoint.

In the Approach_State 524 the FCC generates demands (or commands) including actuator data to apply 0.3 of the air brake, and to follow a trajectory defined by an approach portion of the mission plan. The Approach_State is used by the FCC to guide the vehicle down an approach path and set up conditions for landing (including required positional and speed parameter values).

The FCC transitions from the Approach_State to Circuit_State if:
(a) an Abort_Landing_Command is received (e.g. from the GVC); or
(b) the FCC detects that the vehicle has deviated more than 11m horizontally or vertically from the demanded approach path.

The FCC transitions from the Approach_State 524 to the Landing_State 526 once the vehicle has passed a landing threshold waypoint of the approach path.

In the Landing_State 526, the FCC generates demands when a Flare_Commence flag is false to:
(a) follow a trajectory define by a landing portion of the mission plan;
(b) limit the bank angle of the vehicle as a function of the vehicle's height above ground level (HAGL);
(c) apply airbrake at an effective level, e.g. 0.3 airbrake.

The Landing_State 526 is used by the FCC to perform the final manoeuvres necessary to achieve a three point landing. This includes guidance of the vehicle down the final portion of the landing path and the flare and hold-off of the vehicle to achieve a three point landing with an acceptable sink rate and minimal bounce.

The FCC transitions from the Landing_State 526 to the Circuit_State 522 if an:
(a) an Abort_Landing_Command is received (e.g. from the GVC); or
(b) the FCC detects the vehicle has deviated more than 11m horizontally or vertically from the demanded approach path and the vehicle has not commenced a flare and hold-off manoeuvre.

The FCC transitions from the Landing_State 526 to the Rollout_State 528 when the FCC determines: (i) the vehicle has maintained weight on the wheels for 2 seconds based on data from the WOW sensor 250; and (ii) has reduced its airspeed below the stall speed.

In the Rollout_State 528, the FCC generates demands including actuator data to bring the vehicle to a rest and follow a rollout trajectory path of the mission plan. The Rollout_State is used by the FCC to decelerate the vehicle from landing/takeoff speeds to a halt, whilst steering the vehicle along the runway centreline (as defined by the landing/takeoff waypoints in the mission plan).

The FCC transitions from the Rollout_State 528 to the Taxi_State 510 if the vehicle speed has reduced below 2.0 m/s, the FCC is not receiving manual control commands and a Taxi_Command has been generated (which may come from the GVC).

The FCC transitions from the Rollout_State 528 to the Engine_Shutdown_State 530 if the vehicle speed has reduced below 2.0 m/s, and an Engine_Shutdown_Command is generated (e.g. from the GVC).

In the Engine_Shutdown_State 530, the FCC generates actuator data to:
(a) sets all wheel brakes to fully engaged;
(b) demand zero rates for roll, pitch, yaw sideslip and engine air speed;
(c) disable auto throttle;
(d) demand zero airbrake;
(e) set engine throttle demand to idle;

The Engine_Shutdown_State 530 is used by the FCC to place the vehicle into a known condition where the engine may be shut down, which requires idle throttle and full brakes.

The FCC transitions from Engine_Shutdown_State 530 to Shutdown_State 532 on receipt or generation of a Shutdown_Command (e.g. from the GVC). In the Shutdown_State 532, the FCC places itself into a condition where it can be powered down. The final action before the FCC marks the system as shutdown is to release the wheel brakes on the vehicle so that ground handlers can move it into a hangar.

Many modifications will be apparent to those skilled in the art without departing from the scope of the present invention hose skilled in the art without departing from the scope of the present invention. For example, even through the CSCs are described as embedded software components, they can also be implemented by a hardware circuits, such as ASICS and FPGAs. The invention can also be applied to ground vehicles as well as UAVs.

The claims defining the invention are as follows:

1. A control computer for an unmanned vehicle, comprising:
    a sensor interface for receiving sensor data from sensors of a vehicle, said sensor data including data values associated with movement of the vehicle;
    an actuator control interface for sending actuator data to control actuators of the vehicle, said actuators controlling parts of the vehicle associated with controlling movement of the vehicle; and
    a system management component for:
        executing a state machine having a plurality of states, each state corresponding to one of a plurality of phases of said movement, said actuator data being generated based on a current one of said plurality of states of said state machine; and
        determining a transition between said current state and another of said states based on at least one condition associated with said transition, said at least one condition being determined based on at least one of said sensor data, said actuator data and status of said computer, and said at least one condition associated with said transition representing completion of a phase of movement of said current state.

2. A control computer according to claim 1, wherein said at least one condition represents violation of a movement limit of said vehicle associated with said current state.

3. A control computer according to claim 1, wherein a phase of movement of said vehicle corresponds to a plurality of said states.

4. A control computer according to claim 1, wherein said states include a commence state wherein said actuator data will command said vehicle to be stationary, and said system management component is configured to determine successful initialisation and operation of said computer.

5. A control computer according to claim 1, wherein said states include a navigation alignment state wherein said sensors associated with navigation are tested, and wherein initial navigation sensor data including positional and velocity data is obtained.

6. A control computer according to claim 1, wherein said states include a start engine state, wherein a movement plan is accepted and validated, and an engine of said vehicle is successfully started.

7. A control computer according to claim 1, wherein said states include a position state, wherein said actuator data is generated based on said sensor data to move said vehicle to a launch position as said at least one condition for transition to a launch state.

8. A control computer according to claim 1, wherein said states include a scenario state, wherein the computer generates actuator data to move the vehicle through scenario waypoints of a movement plan.

9. A control computer as claimed in claim 8, wherein the computer comprises:
    guidance, navigation and waypoint management components for generating actuator data based on the sensor data to complete the waypoints.

10. A control computer according to claim 1, wherein the states include an inbound state, and said at least one condition for a transition to the inbound state includes an error condition associated with the vehicle.

11. A control computer as claimed in claim 10, wherein the error condition includes lost communications with a remote controller.

12. A control computer as claimed in claim 10, wherein in the inbound state, the computer generates actuator data for the vehicle to follow an inbound trajectory of a movement plan to return to a base location.

13. A control computer according to claim 1, wherein the states include at least one state where the computer generates actuator data for the vehicle to follow a holding path.

14. A control computer according to claim 1, wherein said states include circuit, approach and landing states corresponding to a landing movement phase of the vehicle.

15. A control computer according to claim 1, wherein said states include a take off and climb out state corresponding to a takeoff movement phase of the vehicle.

16. A control computer according to claim 1, wherein said states include scenario and loiter states that correspond to a cruise movement phase of the vehicle.

17. A control computer according to claim 1, wherein said states include engine shutdown and control computer shutdown states that correspond to a shutdown phase of a vehicle.

18. A method performed by a control computer for an unmanned vehicle, the method comprising:
- receiving sensor data from sensors of the vehicle, said sensor data including data values associated with movement of the vehicle;
- sending actuator data to control actuators of the vehicle, said actuators controlling parts of the vehicle associated with controlling movement of the vehicle;
- executing a state machine having a plurality of states, each state corresponding to one of a plurality of phases of said movement, said actuator data being generated based on a current one of said plurality of states of said state machine; and
- determining a transition between said current state and another of said states based on at least one condition associated with said transition, said at least one condition being determined based on at least one of said sensor data, said actuator data and status of said computer, and said at least one condition associated with said transition representing completion of a phase of movement of said current state.

* * * * *